United States Patent
Mpr et al.

(10) Patent No.: US 9,948,977 B2
(45) Date of Patent: Apr. 17, 2018

(54) SYSTEM, METHOD, AND APPARATUS FOR DETERMINING PRESENTATION TIME FOR PICTURE WITHOUT PRESENTATION TIME STAMP

(75) Inventors: Srinivas Mpr, Karnataka (IN); Sherman Chen, San Diego, CA (US); Sandeep Bhatia, Karnataka (IN)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 2372 days.

(21) Appl. No.: 11/024,561

(22) Filed: Dec. 22, 2004

(65) Prior Publication Data

US 2006/0133515 A1 Jun. 22, 2006
US 2011/0064148 A9 Mar. 17, 2011

Related U.S. Application Data

(63) Continuation-in-part of application No. 10/340,061, filed on Jan. 9, 2003, now Pat. No. 7,787,539.

(51) Int. Cl.
H04N 7/12 (2006.01)
H04N 21/43 (2011.01)

(52) U.S. Cl.
CPC ............................. *H04N 21/4307* (2013.01)

(58) Field of Classification Search
CPC .................................................. H04N 21/4307
USPC ............................................. 375/28; 240/25
See application file for complete search history.

(56) References Cited

U.S. PATENT DOCUMENTS

| | | | | |
|---|---|---|---|---|
| 6,061,399 A | * | 5/2000 | Lyons | H04N 21/23406 375/240 |
| 6,081,299 A | * | 6/2000 | Kesselring | 348/512 |
| 6,320,909 B1 | * | 11/2001 | Takabatake | H04N 19/61 375/240.25 |
| 6,438,169 B1 | * | 8/2002 | Takashima | H04N 7/52 375/240.05 |
| 6,542,549 B1 | * | 4/2003 | Tan | H04N 19/20 348/419.1 |
| 6,671,323 B1 | * | 12/2003 | Tahara et al. | 375/240.26 |
| 6,674,801 B1 | * | 1/2004 | Kim | H04N 21/4307 348/423.1 |
| 6,738,427 B2 | * | 5/2004 | Zetts | 375/240.28 |
| 6,865,747 B1 | * | 3/2005 | Mercier | G11B 20/00086 348/E5.007 |
| 2003/0067989 A1 | * | 4/2003 | Yoshinari | G11B 27/034 375/240.25 |
| 2003/0667989 | * | 4/2003 | Yoshinari Hiromi | G11B 27/034 375/240.25 |
| 2003/0138051 A1 | * | 7/2003 | Chen et al. | 375/240.26 |
| 2004/0013270 A1 | * | 1/2004 | Bae et al. | 381/1 |
| 2004/0165665 A1 | * | 8/2004 | Harumoto et al. | 375/240.26 |
| 2006/0098742 A1 | * | 5/2006 | Meenakshisundaram et al. | 375/240.27 |

* cited by examiner

*Primary Examiner* — Jessica M Prince
(74) *Attorney, Agent, or Firm* — Foley & Lardner LLP

(57) ABSTRACT

Presented herein are system(s), method(s), and apparatus for determining the presentation time for a picture without a presentation time stamp. A first and second picture are decoded. The first picture is a reference picture for the second picture. The presentation time for the second pictures is computed as a function of a presentation time and a decode time for the first picture.

18 Claims, 5 Drawing Sheets

SYSTEM, METHOD, AND APPARATUS FOR DETERMINING PRESENTATION TIME FOR PICTURE WITHOUT PRESENTATION TIME STAMP

RELATED APPLICATIONS

This application is a continuation-in-part of U.S. application for patent, Ser. No. 10/340,061, filed Jan. 9, 2003 by Chen, that issued as U.S. Pat. No. 7,787,539 on Aug. 31, 2010.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In MPEG-2 video, a B-picture can be encoded by one picture displayed before, called the forward reference picture and one picture displayed after, called the backward reference picture. Encoded B-pictures are data dependent on these reference pictures. The reference pictures are decoded prior to the B-picture. One of the reference pictures, however is displayed after the B-picture.

As a result, the decoding order and the displaying order can be different. The decoder system receives the pictures in the decoding order. After decoding the pictures, the decoder system reorders the pictures into the display order. A display engine displays the reordered pictures.

A multimedia program can include a video, multiple audio channels, and data channels. The video, audio channels, and data channels are synchronized to make the program intelligible. Time stamps are used to achieve this synchronization.

As noted above, the video pictures have a decoding order and a display time. Decoding time stamps (DTS) indicate the decoding time. Presentation time stamps (PTS) indicate the display order. The video encoder encodes the DTS and PTS into the video program. The DTS and PTS are 33-bit numbers that are driven by a 27 MHz clock.

The DTS and PTS add overhead to the transmitted stream. Encoders encode the time stamps on a periodic basis. MPEG allows as much as 700 ms between time stamps. For a display rate of 30 interlaced pictures/sec (60 fields/sec.), there can be as many as 41 consecutive fields without time stamps.

A decoder system can interpolate the DTS and PTS values of the pictures without time stamps. The decoding and presentation times are spaced evenly apart. The decoder system can interpolate the decode time because the pictures are provided in decode order. The decoder system interpolates the presentation time by evaluating the type of pictures. However, interpolating the PTS values involves decoding numerous parameters and pictures. This can be unfeasible where a large number of consecutive pictures are without time stamps. This is particular complex in cases where there are a large number of consecutive B-pictures.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are system(s), method(s), and apparatus for determining the presentation time for a picture without a presentation time stamp.

In one embodiment, there is presented a method for determining a presentation time for pictures. The method comprises decoding a first picture; decoding a second picture, the first picture being a reference picture for the second picture; and computing a presentation time for the second picture, based on a presentation time and a decode time for the first picture.

In another embodiment, there is presented a circuit for determining a presentation time for pictures. The circuit comprises a processor and a memory connected to the processor. The memory stores a plurality of executable instructions. The execution of the instructions by the processor causes: decoding a first picture; decoding a second picture, wherein the first picture is a reference picture for the second picture; and computing a presentation time for the second picture, based on a presentation time and a decode time for the first picture.

In another embodiment, there is presented a system for determining presentation times for pictures. The system comprises a video decoder, a frame buffer, and a buffer descriptor structure. The video decoder decodes a first picture and a second picture, the first picture being a reference picture for the second picture. The frame buffer stores the first picture. The buffer descriptor structure stores a presentation time and a decode time for the first picture. The video decoder computes a presentation time for the second picture, based on a presentation time and a decode time for the first picture.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
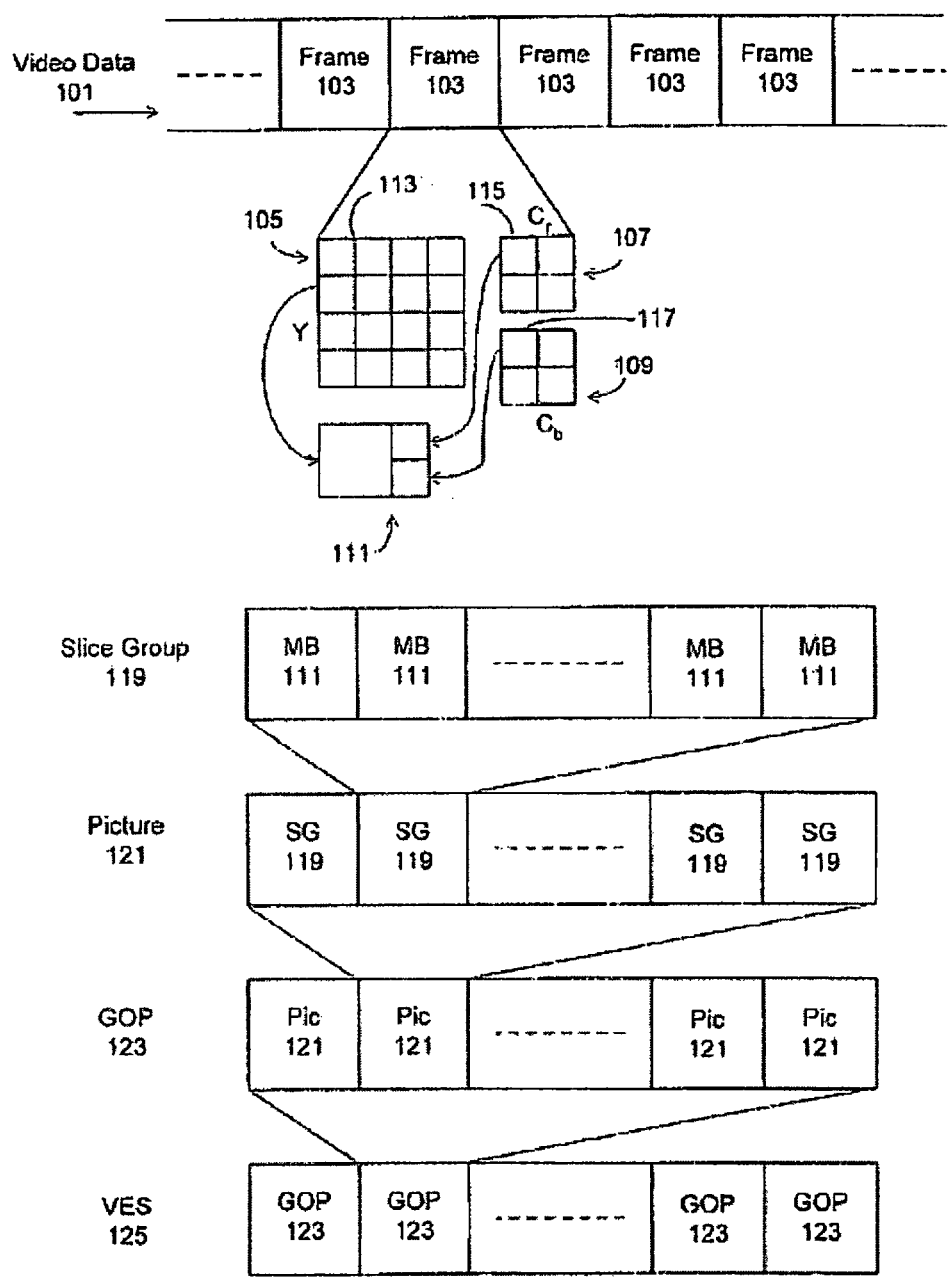
FIG. 1a illustrates a block diagram of an exemplary Moving Picture Experts Group (MPEG) encoding process, in accordance with an embodiment of the present invention.

FIG. 1a illustrates a block diagram of an exemplary Moving Picture Experts Group (MPEG) encoding process of video data 101, in accordance with an embodiment of the present invention. The video data 101 comprises a series of pictures 103. Each picture 103 comprises two-dimensional grids of luminance Y, 105, chrominance red $C_r$, 107, and chrominance blue $C_b$, 109, pixels.

Figure 1B:
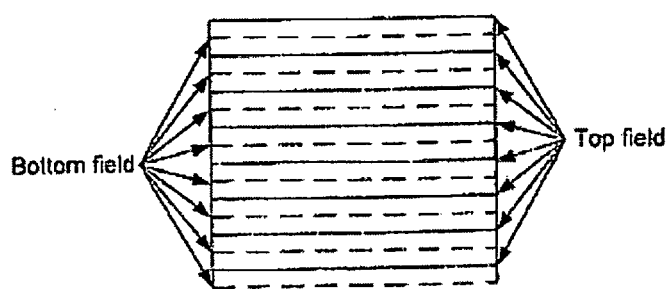
FIG. 1b illustrates an exemplary interlaced picture, in accordance with an embodiment of the present invention.

FIG. 1b is an illustration of a picture 103. A picture 103 can either be captured as an interlaced picture or as a progressive picture. In an interlaced picture 103, the even-numbered lines are captured during one time interval, while the odd-numbered lines are captured during an adjacent time interval. The even-numbered lines form the top field, while the odd-numbered lines form the bottom field of the interlaced picture.

Similarly, a display device can display a picture in progressive format or in interlaced format. A progressive display displays the lines of a picture sequentially, while an interlaced display displays one field followed by the other field. In a special case, a progressive picture can be displayed on an interlaced display by displaying the even-numbered lines of the progressive picture followed by the odd-numbered lines, or vice versa.

Referring again to FIG. 1a, the two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring pictures 103 usually have many similarities. Motion causes an increase in the differences between pictures, the difference being between corresponding pixels of the pictures, which necessitate utilizing large values for the transformation from one picture to another. The differences between the pictures may be reduced using motion compensation, such that the transformation from picture to picture is minimized. The idea of motion compensation is based on the fact that when an object moves across a screen, the object may appear in different positions in different pictures, but the object itself does not change substantially in appearance, in the sense that the pixels comprising the object have very close values, if not the same, regardless of their position within the picture. Measuring and recording the motion as a vector can reduce the picture differences. The vector can be used during decoding to shift a macroblock 111 of one picture to the appropriate part of another picture, thus creating movement of the object. Hence, instead of encoding the new value for each pixel, a block of pixels can be grouped, and the motion vector, which determines the position of that block of pixels in another picture, is encoded.

Accordingly, most of the macroblocks 111 are compared to portions of other pictures 103 (reference pictures). When an appropriate (most similar, i.e. containing the same object(s)) portion of a reference picture 103 is found, the differences between the portion of the reference picture 103 and the macroblock 111 are encoded. The location of the portion in the reference picture 103 is recorded as a motion vector. The encoded difference and the motion vector form part of the data structure encoding the macroblock 111. In the MPEG-2 standard, the macroblocks 111 from one picture 103 (a predicted picture) are limited to prediction from portions of no more than two reference pictures 103. It is noted that pictures 103 used as a reference pictures for a predicted picture 103 can be a predicted picture 103 from other reference pictures 103.

The macroblocks 111 representing a picture are grouped into different slice groups 119. The slice group 119 includes the macroblocks 111, as well as additional parameters describing the slice group. Each of the slice groups 119 forming the picture form the data portion of a picture structure 103. The picture 103 includes the slice groups 119 as well as additional parameters that further define the picture 103.

The picture 103 also includes a header 103h storing various parameters that relate to the picture. The parameters may include, for example, a picture structure indicator (picture/top-field/bottom-field), a progressive picture sequence flag (usually comes in transport layer), a progressive picture flag, and a repeat first field parameter. It is noted that in varying standards there may be additional or less parameters.

The progressive picture parameter indicates whether the picture has been encoded as a progressive picture. If the bit is set, the picture has been encoded as a progressive picture. If the bit is not set, the picture has been encoded as an interlaced picture.

The picture structure parameter specifies the picture structure corresponding to the image buffer. Pan scan vectors specify the displayable part of the picture. The aspect ratio indicates the aspect ratio of the image buffer. The decode and display horizontal size parameters indicate the decoded and the displayable horizontal sizes of the image buffer, respectively.

The repeat first field is a one-bit parameter that specifies whether the first displayed field of the picture is to be redisplayed after the second field, for an interlaced sequence. The repeat first field is used to display motion picture standard material on a National Television Standard Committee (NTSC) display. The motion picture standard material includes 24 progressive pictures per second. The national television standard displays 60 fields per second. To display the motion picture standard material on the NTSC display, a technique known as 3:2 pull down is used.

In 3:2 pulldown, the even numbered lines and odd-numbered lines form the top field and bottom field, respectively. Two pictures or four pictures from the motion picture standard material correspond to 2.5 picture periods or 5 field periods for the NTSC display. For every two progressive motion picture standard pictures, four fields are generated. One of the fields from the second picture is repeated. The repeat first field indicates whether the first field is repeated.

Figure 1C:
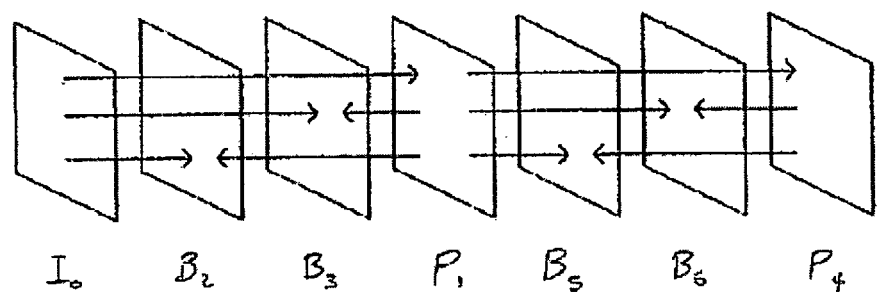
FIG. 1c illustrates an exemplary sequence of pictures in display order.

$I_0$, $B_2$, $B_3$, $P_1$, $B_5$, $B_6$, and $P_4$, FIG. 1c, are exemplary pictures. The arrows illustrate the temporal prediction dependence of each picture. For example, picture $B_2$ is dependent on reference pictures $I_0$, and $P_1$. Pictures coded using temporal redundancy with respect to exclusively earlier pictures of the video sequence are known as predicted pictures (or P-pictures), for example picture $P_1$ is coded using reference picture $I_0$. Pictures coded using temporal redundancy with respect to earlier and/or later pictures of the video sequence are known as bi-directional pictures (or B-pictures), for example pictures $B_2$ is coded using pictures $I_0$ and $P_1$. Pictures not coded using temporal redundancy are known as I-pictures, for example $I_0$. In the MPEG-2 standard, I-pictures and P-pictures are also referred to as reference pictures.

Figure 1D:
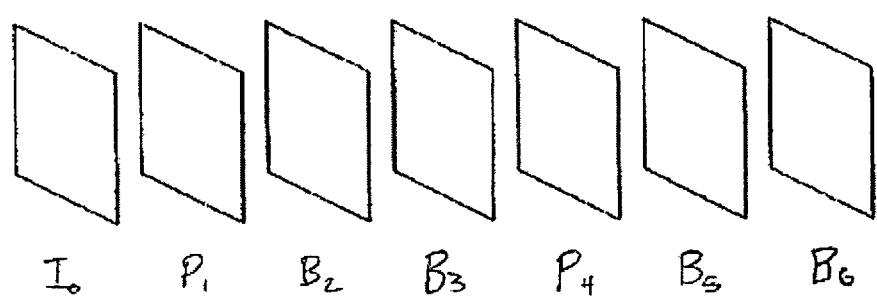
FIG. 1d illustrates an exemplary sequence of pictures in decoding order.

The foregoing data dependency among the pictures requires decoding of certain pictures prior to others. Additionally, the use of later pictures as reference pictures for previous pictures requires that the later picture is decoded prior to the previous picture. As a result, the pictures cannot be decoded in temporal display order, i.e. the pictures may be decoded in a different order than the order in which they will be displayed on the screen. Accordingly, the pictures are transmitted in data dependent order, and the decoder reorders the pictures for presentation after decoding. $I_0, P_1, B_2, B_3, P_4, B_5, B_6$, FIG. 1d, represent the pictures in data dependent and decoding order, different from the display order seen in FIG. 1c.

Referring again to FIG. 1a, the pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence 130. The packetized elementary sequence 130 includes packets of varying length.

The packets 130 include a header 130h storing a number of parameters. The parameters can include decode time stamps (DTS) and presentation time stamps (PTS). The DTS indicates the decoding order. The PTS indicates the display order. Encoders encode the time stamps into the PES headers on a periodic basis. MPEG allows as much as 700 ms between time stamps. For a display rate of 30 interlaced pictures/sec (60 fields/sec.), there can be as many as 41 consecutive fields without time stamps. Flags in the PES header 130h indicate the presence of the PTS and DTS.

The packetized elementary sequence 130 is then packetized into uniform length packets 135. Each packet 135 is then associated with a transport header, forming what are known as transport packets. The transport packets 135 can be multiplexed with other transport packets 135 carrying other content, such as another video elementary stream 125 or an audio elementary stream. The multiplexed transport packets form what is known as a transport stream. The transport stream is transmitted over a communication medium for decoding and displaying.

Figure 2:
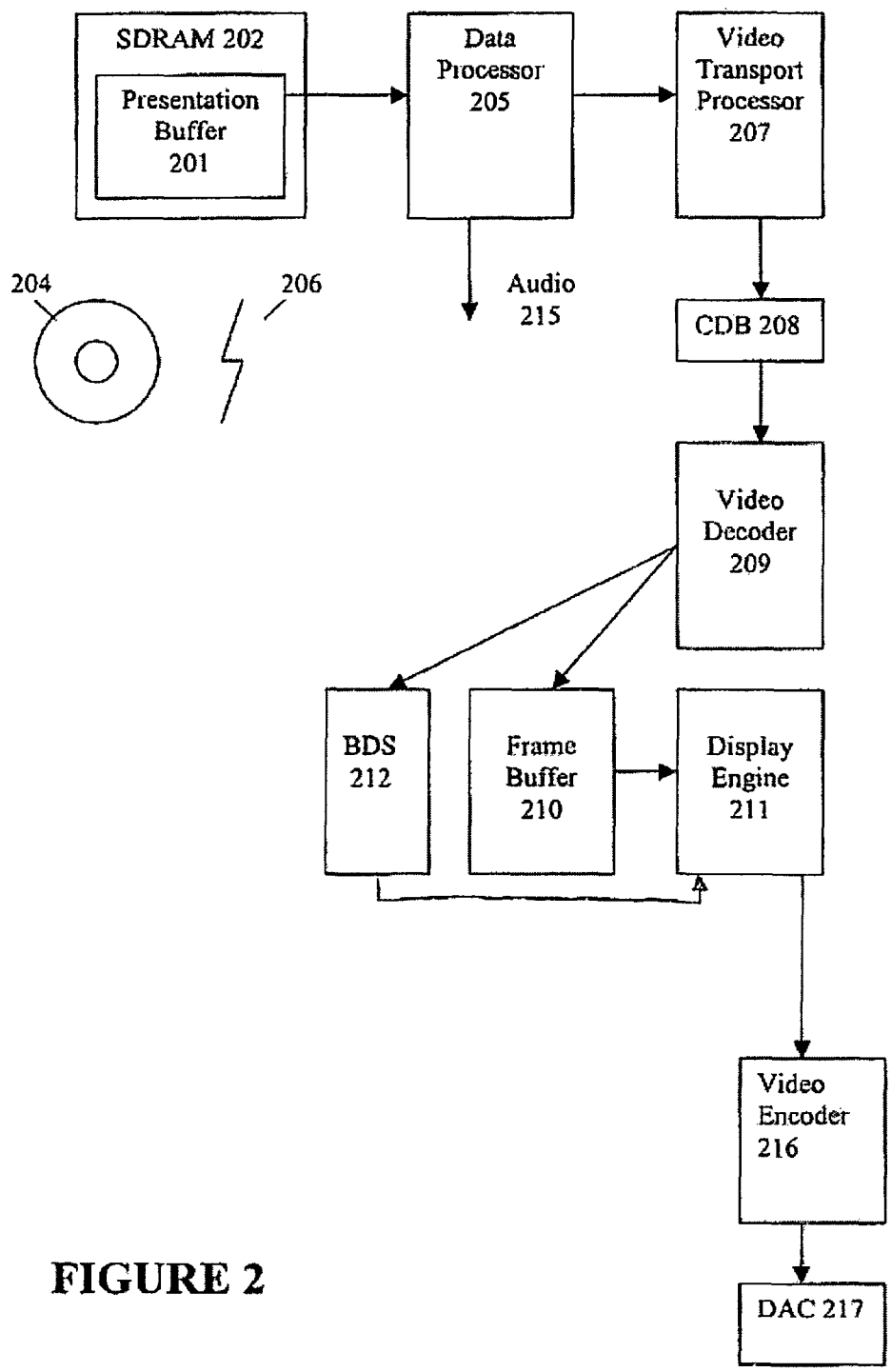
FIG. 2 illustrates a block diagram of an exemplary circuit for decoding the compressed video data, in accordance with an embodiment of the present invention.

FIG. 2 illustrates a block diagram of an exemplary circuit for decoding the compressed video data, in accordance with an embodiment of the present invention. Data is received and stored in a presentation buffer 201 within a Synchronous Dynamic Random Access Memory (SDRAM) 202. The data can be received from either a communication channel or from a local memory, such as, for example, a hard disc or a DVD.

The data output from the presentation buffer 201 is then passed to a data transport processor 205. The data transport processor 205 demultiplexes the transport stream into packetized elementary stream constituents, and passes the audio transport stream to an audio section 215 and the video transport stream to a video transport processor 207 and then to a compressed data buffer 208 for a video decoder 209. The audio data is then sent to the output blocks, and the video is sent to a display engine 211.

The display engine 211 scales the video picture, renders the graphics, and constructs the complete display. Once the display is ready to be presented, it is passed to a video encoder 216 where it is converted to analog video using a digital to analog converter (DAC) 217.

The video decoder 209 decodes at least one picture, $I_0, B_1, B_2, P_3, B_4, B_5, P_6, \ldots$, during each picture display period, in the absence of Personal Video Recording (PVR) modes when live decoding is turned on. Due to the presence of the B-pictures, $B_1, B_2$, the video decoder 209 decodes the pictures, $I_0, B_1, B_2, P_3, B_4, B_5, P_6, \ldots$, in an order that is different from the display order. The video decoder 209 decodes each of the reference pictures, e.g., $I_0, P_3$, prior to each picture that is predicted from the reference picture. For example, the video decoder 209 decodes $I_0, B_1, B_2, P_3$, in the order, $I_0, P_3, B_1$, and $B_2$. After decoding $I_0$ and $P_3$, the video decoder 209 applies the offsets and displacements stored in $B_1$ and $B_2$, to the decoded $I_0$ and $P_3$, to decode $B_1$ and $B_2$. In order to apply the offset contained in $B_1$ and $B_2$, to the decoded $I_0$ and $P_3$, the video decoder 209 stores decoded $I_0$ and $P_3$ in memory known as frame buffers 210. The display engine 211, then displays the decoded images onto a display device, e.g. monitor, television screen, etc., at the proper time and at the correct spatial and temporal resolution.

Since the images are not decoded in the same order in which they are displayed, the display engine 211 lags behind the video decoder 209 by a delay time. In some cases the delay time may be constant. Accordingly, the video decoder 209 writes the decoded images in frame buffers 210 so that the display engine 211 can display them at the appropriate time. Additionally, the video decoder 209 writes parameters associated with the decoded pictures in buffer descriptor structures 212. These parameters include the Presentation Time Stamp (PTS), the Decode Time Stamp (DTS), repeat first field, and top field first parameters, to name a few.

The display engine 211 uses the PTS to determine when to display the decoded pictures. However, not every picture has a PTS. Where a pictures does not have a PTS, the video decoder 209 calculates the presentation time and writes the presentation time for the picture in the buffer descriptor structures 220. The video decoder 209 calculates the PTS based on the DTS and PTS of future reference pictures, and repeat first field parameters, and writes the calculated presentation time to the buffer descriptor structures 220. The computation will now be described.

Figure 3:
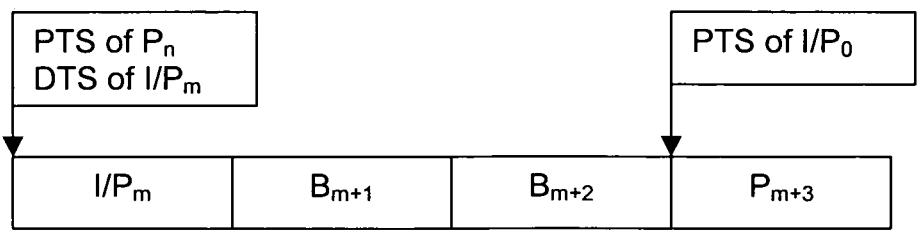
FIG. 3 is a timing diagram describing the presentation time and decoding times for exemplary pictures.

Referring now to FIG. 3, there is illustrated a graph describing the decoding and presentation times for an exemplary set of pictures, $P_n, \ldots I_m, B_{m+1}, B_{m+2}, P_{m+3}, B_{m+4}, B_{m+5}, \ldots$, where the subscripts indicate the decoding order. Picture $P_n$ is from a previous sequence that the video decoder 209 did not encounter, and the video decoder 209 locks onto the sequence starting $I_0$. The display sequence is $P_n, B_{m+1}, B_{m+2}, I_m, B_{m+4}, B_{m+5}, P_{m+3}$.

It would not be possible to determine the PTS value of picture $B_{m+1}$ from $P_n$, because picture $P_n$ is from a previous sequence that the video decoder 209 did not encounter. It may be possible to compute the PTS value of picture $B_{m+1}$ from $P_{m+3}$. However, in order to compute the PTS for $B_{m+1}$, information about picture $B_{m+2}$ and $P_{m+3}$ is needed. If the number of B pictures is increased, the number of frames that would need to be examined also increases.

Picture $B_{m+1}$ is predicted from picture $I_m$. Because $I_m$ is displayed after $B_{m+1}$, $I_m$ is the future reference picture for $B_{m+1}$. Therefore, Im and information associated with $I_m$ are stored in frame buffers and buffer descriptor structures, during decoding of $B_{m+1}$.

As can be seen, I and P pictures are displayed when the subsequent I or P picture is decoded. Therefore, the difference between the PTS and DTS associated with an I or P picture indicates the total number of displayable fields between the previous I or P picture and the current I or P picture. For example, the difference between the PTS and DTS associated with $I_m$ indicates the number of pictures between the previous I or P picture, $P_n$, and $I_n$. The difference between the PTS and DTS is the time required to display 6 fields. Therefore:

PTS for $B_{m+1}$=DTS of picture $I_m$+2*Time to Display Field

It is preferable to calculate the PTS for a $B_{m+1}$ from the future prediction picture, $I_m$, because the future reference picture is normally stored in a frame buffer when decoding a predicted picture. Therefore, no additional memory is required. Additionally, the PTS for $B_{m+1}$ can be determined without information regarding subsequent pictures, $B_{m+2}$ and $P_{m+3}$.

Below is a decision table, indicating the decisions made by the video decoder 209, based on the PTS and DTS of a future reference picture, the repeat first field parameter.

| PTS − DTS $I_m/P_m$ picture | RFF − $B_{m+1}$ | Presentation Time | Picture Sequence |
| --- | --- | --- | --- |
| 6 fields (3 frames) | X | DTS + 2 Field time | $P_n$ = F, $B_{m+1}$ = F, $B_{m+2}$ = F |
| 7 fields (3.5 frames) | 0 | DTS + 2 Field time | $P_n$ = F, $B_{m+1}$ = F, $B_{m+2}$ = TBT |
| 7 fields (3.5 frames) | 1 | DTS + 2 Field time | $P_n$ = F, $B_{m+1}$ = TBT, $B_{m+2}$ = F |
| 8 fields (4 frames) | 0 | DTS + 3 Field time | $P_n$ = TBT, $B_{m+1}$ = F, $B_{m+2}$ = TBT |
| 8 fields (4 frames) | 1 | DTS + 2 Field time | $P_n$ = F, $B_{m+1}$ = TBT, $B_{m+2}$ = BTB |
| 9 fields (4.5 frames) | X | DTS + 3 Field time | $P_n$ = TBT, $B_{m+1}$ = TBT, $B_{m+2}$ = TBT |
| >9 fields | X | — | Default: DTS + 2 Field time |

T = Top Field,
B = Bottom Field,
F = Frame/(Pair of Fields),
X = Don't Care

Figure 4:
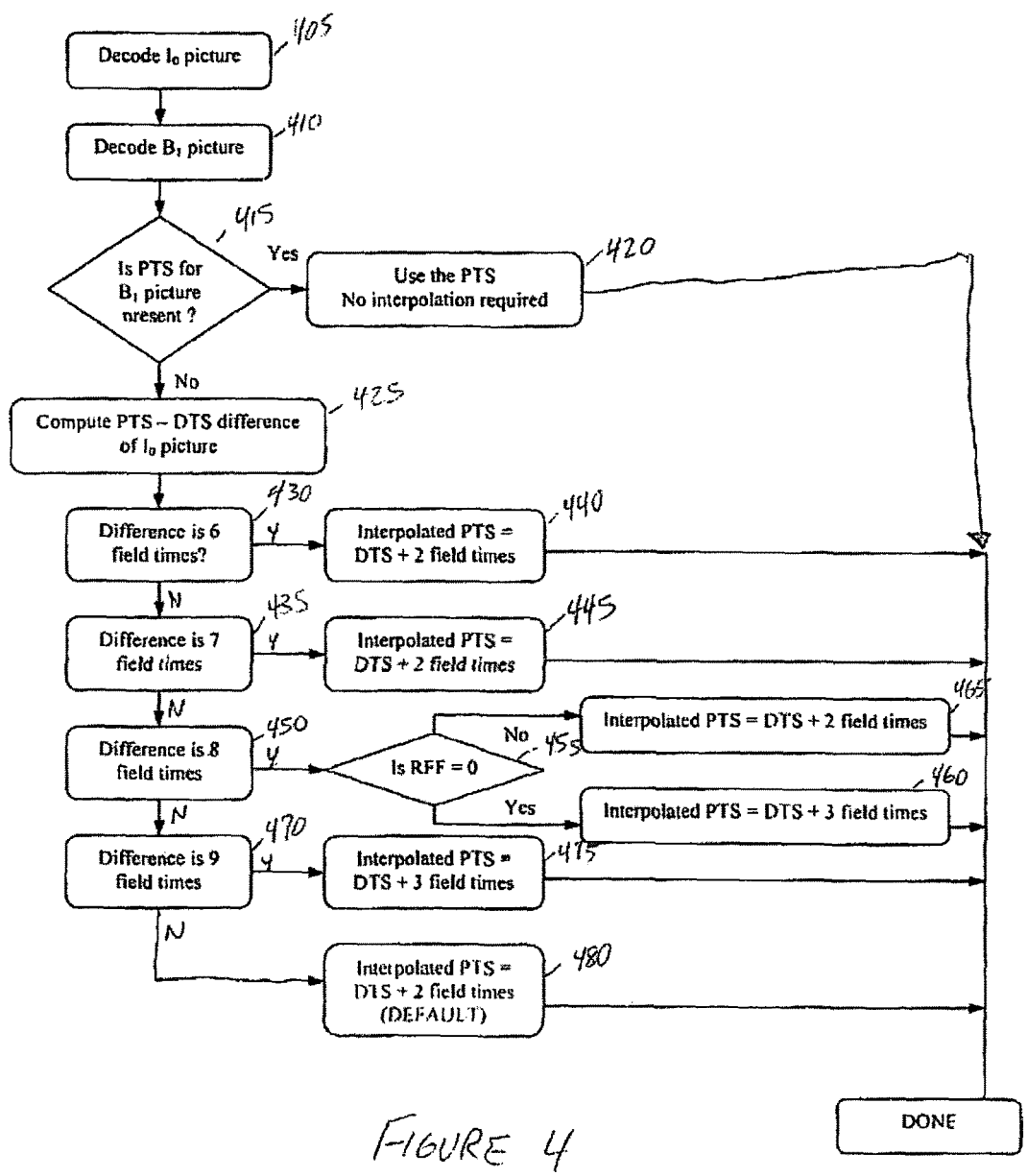
FIG. 4 is a flow diagram for determining a presentation time for a picture, in accordance with an embodiment of the present invention.

Referring now to FIG. 4, there is illustrated a flow diagram for determining the presentation time for B-picture, $B_{m+1}$, following an I/P picture, $I_m$ or $P_m$, in accordance with an embodiment of the present invention. At 405, the video decoder 209 decodes picture I/$P_m$, writing the decoded picture to the frame buffers, and parameters associated with the picture to buffer descriptor structures. At 410, the video decoder 209 decodes picture $B_{m+1}$. At 415, the video decoder 209 determines whether picture $B_{m+1}$ includes a PTS. If picture $B_{m+1}$ includes a PTS, the video decoder 209 uses the PTS as the presentation time and writes the PTS to the buffer descriptor structures at 420.

If the picture B.sub.m+1 does not include a PTS, at 425 the video decoder 209 computes the difference between the PTS and DTS associated with picture I/P.sub.m. If the difference is 6 or 7 times the display time for a field, at 430 or 435, respectively, the video decoder 209 calculates at 440 or 445, the presentation time as the DTS of I/P.sub.m+2 field display times and writes the foregoing for the PTS in the buffer descriptor structures.

If the difference is 8 times the display time for a field, at 450, the video decoder 209 examines the repeat first field parameter for $B_{m+1}$ and determines (455) whether the parameter is 0 or not. If 0, the video decoder 209 calculates at 460 the presentation time as the DTS of I/$P_m$+3 field display times and writes the foregoing for the PTS in the buffer descriptor structures. If 1, the video decoder 209 calculates at 465 the presentation time as the DTS of I/$P_m$+2 field display times and writes the foregoing for the PTS in the buffer descriptor structures.

If the difference is 9 times the display time for a field at 470, the video decoder 209 calculates at 475, the presentation time as the DTS of I/$P_m$+3 field display times and writes the foregoing for the PTS in the buffer descriptor structures.

If the difference is other than 6-9 field display times, the video decoder 209 calculates at 480, the presentation time as the DTS of I/$P_m$+2 field display times and writes the foregoing for the PTS in the buffer descriptor structures.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for determining a presentation time for pictures, the method comprising:
    decoding a first picture with a decoder;
    decoding a second picture, the first picture being a reference picture for the second picture; and
    determining a presentation time for the second picture using a difference between a presentation time for the first picture and a decode time for the first picture.

2. The method of claim 1, wherein the first picture is a future reference picture for the second picture.

3. The method of claim 1, wherein the first picture is associated with a presentation time stamp indicating the presentation time for the first picture, and a decode time stamp indicating the decode time for the first picture.

4. The method of claim 1, wherein the presentation time for the second picture is further determined using a repeat first field parameter.

5. A circuit for determining a presentation time for pictures, the circuit comprising:
    a processor; and
    a memory coupled to the processor, the memory storing a plurality of executable instructions, wherein execution of the instructions by the processor causes:
        decoding a first picture;
        decoding a second picture, the first picture being a reference picture for the second picture; and determining a presentation time for the second picture using a difference between a presentation time for the first picture and a decode time for the first picture.

6. The circuit of claim 5, wherein the first picture is a future reference picture for the second picture.

7. The circuit of claim 5, wherein the first picture is associated with a presentation time stamp indicating the presentation time for the first picture, and a decode time stamp indicating the decode time for the first picture.

8. The circuit of claim 5, wherein the presentation time for the second picture is further determined using a repeat first field parameter.

9. A system for determining a presentation time for pictures, the system comprising:
   a video decoder configured to decode a first picture and decode a second picture, the first picture being a reference picture for the second picture;
   a frame buffer configured to store the first picture; and
   a buffer descriptor structure configured to store a presentation time for the first picture and a decode time for the first picture,
   wherein the video decoder is configured to determine a presentation time for the second picture using a difference between the presentation time for the first picture and the decode time for the first picture.

10. The system of claim 9, wherein the first picture is a future reference picture for the second picture.

11. The system of claim 9, wherein the first picture is associated with a presentation time stamp indicating the presentation time for the first picture, and a decode time stamp indicating the decode time for the first picture.

12. The system of claim 9, wherein the presentation time for the second picture is further determined using a repeat first field parameter.

13. The method of claim 4, further comprising determining whether the second picture is associated with the repeat first field parameter, based on the presentation time stamp of the first picture and the decode time stamp of the first picture.

14. The method of claim 4, further comprising determining whether a third picture is associated with the repeat first field parameter, based on the presentation time stamp of the first picture and the decode time stamp of the first picture.

15. The circuit of claim 8, further comprising determining whether the second picture is associated with the repeat first field parameter, based on the presentation time stamp of the first picture and the decode time stamp of the first picture.

16. The circuit of claim 8, further comprising determining whether a third picture is associated with the repeat first field parameter, based on the presentation time stamp of the first picture and the decode time stamp of the first picture.

17. The system of claim 12, further comprising determining whether the second picture is associated with the repeat first field parameter, based on the presentation time stamp of the first picture and the decode time stamp of the first picture.

18. The system of claim 12, further comprising determining whether a third picture is associated with the repeat first field parameter, based on the presentation time stamp of the first picture and the decode time of the first picture.

* * * * *

UNITED STATES PATENT AND TRADEMARK OFFICE
CERTIFICATE OF CORRECTION

PATENT NO. : 9,948,977 B2  
APPLICATION NO. : 11/024561  
DATED : April 17, 2018  
INVENTOR(S) : Srinivasa M. P. Reddy, Xuemin Chen and Sandeep Bhatia Page 1 of 1

It is certified that error appears in the above-identified patent and that said Letters Patent is hereby corrected as shown below:

On the Title Page

Item (75) should read as follows:  
(75) Inventors:  Srinivasa M. P. Reddy, Karnataka (IN);  
                   Xuemin Chen, San Diego, CA (US);  
                   Sandeep Bhatia, Karnataka (IN)

Signed and Sealed this  
Twenty-ninth Day of May, 2018

Andrei Iancu  
*Director of the United States Patent and Trademark Office*